No. 721,228. PATENTED FEB. 24, 1903.
F. PHILIPS.
PULLEY RIM SECTION.
APPLICATION FILED JUNE 18, 1901.
NO MODEL.
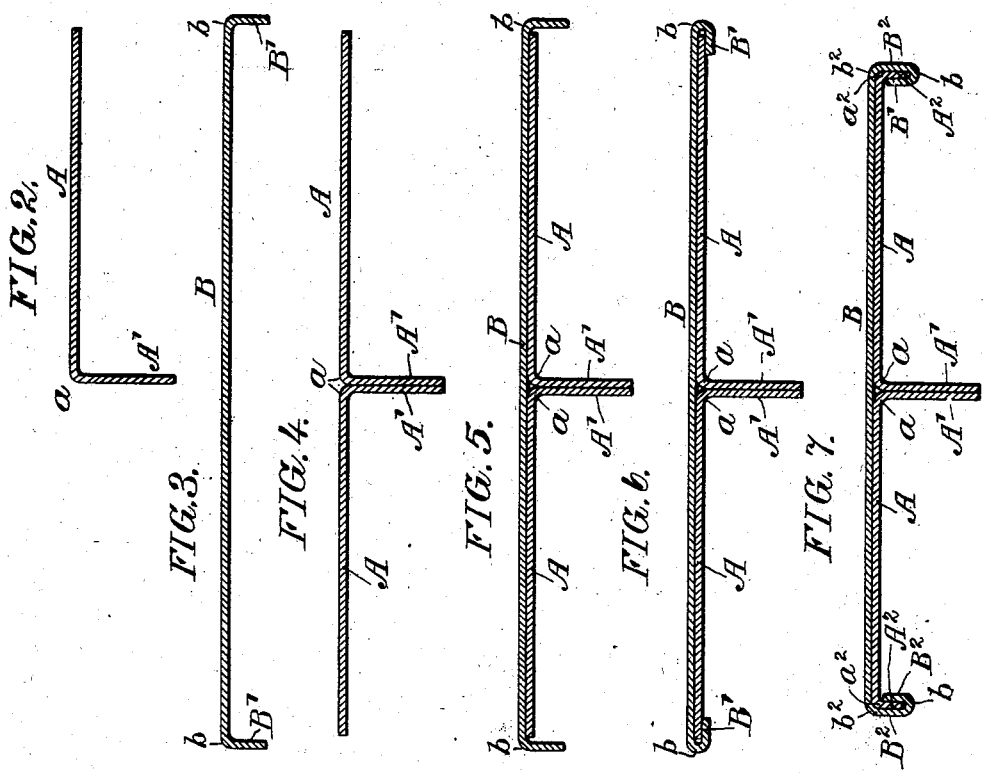
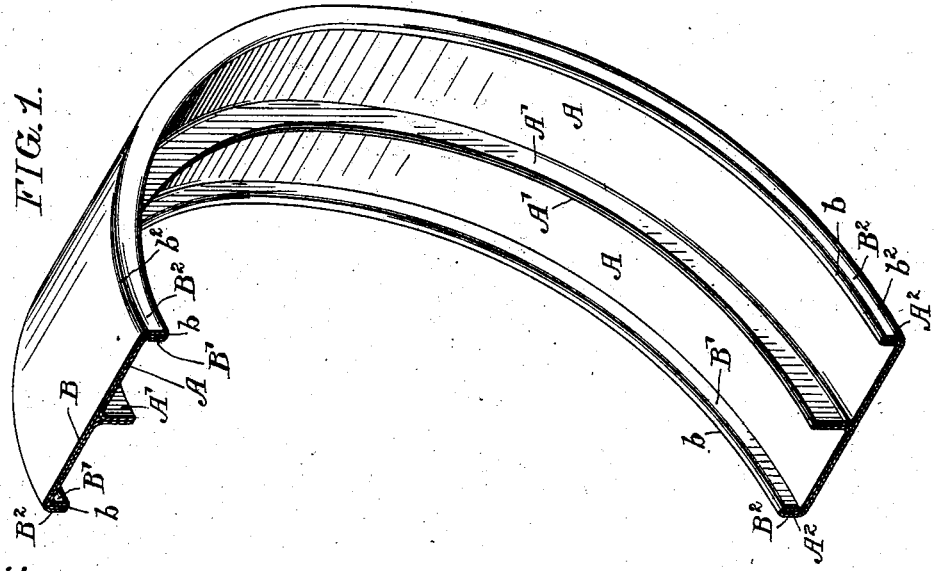
Witnesses: Inventor:

UNITED STATES PATENT OFFICE.

FERDINAND PHILIPS, OF PHILADELPHIA, PENNSYLVANIA.

PULLEY-RIM SECTION.

SPECIFICATION forming part of Letters Patent No. 721,228, dated February 24, 1903.

Application filed June 18, 1901. Serial No. 65,011. (No model.)

*To all whom it may concern:*

Be it known that I, FERDINAND PHILIPS, a subject of the Emperor of Germany, residing in the city and county of Philadelphia, in the State of Pennsylvania, have invented a certain new and useful Improvement in Pulley-Rim Sections, of which the following is a true and exact description, reference being had to the accompanying drawings, which form a part thereof.

My invention relates to pulley-rim sections made out of sheet metal, and has for its object to provide a section of strong, simple, and durable construction and which can be readily and inexpensively manufactured.

The nature of my improvements will be best understood as described in connection with the drawings, in which they are illustrated, and in which—

Figure 1 is an isometric projection of my improved pulley-rim section in its preferred form. Fig. 2 shows the shape of one of the sheet-metal parts of which the pulley is made, there being two such parts in the rim. Fig. 3 shows the construction and shape of the third plate of which the pulleys are made. Figs. 4, 5, 6, and 7 illustrate progressively the mode of assembling the parts and securing them together.

The pulley is made up of two bent plates, such as are shown in Fig. 2, the broad face of the plate being indicated at A and the plate being bent at right angles at the point $a$ to form the flange A'. Two of these plates are assembled as shown in Fig. 4, the flanges A' being abutted together. The third plate (indicated at B in Fig. 3) has its ends bent in on the lines indicated at $b\ b$ to form the flanges B B'. This plate is placed on top of the faces A A, as indicated in Fig. 5, and the flanges B' are then bent in, as indicated in Fig. 6. By preference the lapped ends of the plates A and B are then bent downward, as shown in Fig. 7, new bends being formed on the lines indicated at $a^2$ and $b^2$ and a new flange $B^2$, formed on the plate B, abutting and lapping a flange $A^2$, formed on the ends of the plates A. The plates assembled in this way are then bent into the segment of a circle, as illustrated in Fig. 1, and, as will readily be perceived, the curvature of the plates and flanges is such as to securely lock all the plates together and make a rim-section of remarkable strength as well as of remarkably simple and durable construction.

Having now described my invention, what I claim as new, and desire to secure by Letters Patent, is—

1. A pulley-rim section made up of two plates having broad faces A and short flanges A' extending at right angles to the faces A, said plates having these flanges A' A' abutted together and a plate B extending over the faces A A of the first plates and having its ends B' B' bent over the ends of said faces A A, said plates assembled as described being curved in the segment of a circle and thereby securely locked together.

2. A pulley-rim section made up of plates A A' having their flanges A' abutted together and a plate B extending over the faces A A, of the plates A A' and having its ends bent over the ends of said faces A and the lapped ends of the plates A A' and the plate B being bent in to form a flange parallel to the flanges A' A'; said plates, assembled, as described, being curved in the segment of a circle and thereby securely locked together.

FERDINAND PHILIPS.

Witnesses:
CHAS. F. MYERS,
D. STEWART.